United States Patent [19]

Weber

[11] Patent Number: 4,605,033

[45] Date of Patent: Aug. 12, 1986

[54] PNEUMATIC CONVERTER HAVING VARIABLE GAIN RELAY STACK

[75] Inventor: Lee A. Weber, Mentor, Ohio

[73] Assignee: The Babcock & Wilcox Company, New Orleans, La.

[21] Appl. No.: 655,172

[22] Filed: Sep. 27, 1984

[51] Int. Cl.$^4$ ............................................. G05D 16/00
[52] U.S. Cl. ........................................ 137/84; 137/85
[58] Field of Search .................... 137/85, 86, 84, 82

[56] References Cited

U.S. PATENT DOCUMENTS

| | | | |
|---|---|---|---|
| 2,742,917 | 4/1956 | Broditch | 137/86 |
| 2,793,540 | 5/1957 | Cronk | 137/85 X |
| 3,047,002 | 7/1962 | Jaquith | 137/85 |
| 3,262,463 | 7/1966 | Granada | 137/85 |
| 4,449,546 | 5/1984 | Bader | 137/86 |

Primary Examiner—Alan Cohan
Attorney, Agent, or Firm—Vytas R. Matas; Robert J. Edwards

[57] ABSTRACT

A pneumatic positioner is provided with a O-shaped vane that is movably supported at the ends of each of its legs. The nozzle has an air outlet proximate to and aligned with the vane. A nozzle, connected to a source of air under pressure, is attached to a disc for rotation about a central stem that extends through the O-shaped recess. The nozzle has an air outlet proximate to and aligned with the vane. The disc is rotatable about the stem to reposition the nozzle relative to the vane so that air issuing from the outlet of the nozzle can impinge upon the vane at different locations along the length of the vane, intermediate the ends of the legs of the vane. One end of the vane is attached to an input and feedback signal mechanism and the opposite end of the vane is connected to a relay center structure.

3 Claims, 4 Drawing Figures

PNEUMATIC CONVERTER HAVING VARIABLE GAIN RELAY STACK

TECHNICAL FIELD

This invention relates to pneumatic converters in postioners which employ an air supply to drive the piston or diaphragm of a pneumatic actuator to a position called for by a control signal.

BACKGROUND OF THE INFORMATION

In a known type of pneumatic positioner, a signal capsule is attached to one end of a vane and a relay structure is attached to the other end of the vane. A nozzle is positioned proximate to the vane intermediate the signal capsule and relay structure. The nozzle is continually pressurized by a source of compressed air. In operation, an increasing pneumatic input control signal applied to the signal capsule moves the vane toward the nozzle so as to decrease the clearance between the vane and the nozzle and thereby increase the nozzle back pressure. The back pressure, acting against a supply pressure, moves the relay structure so as to proportionately open and close air supply and exhaust valves to regulate the air supply or exhaust and provide a signal pressure differential that displaces a final control element. The amount by which the relay structure moves is determined by the distance the vane moves away from the nozzle, decreasing nozzle back pressure, and causing the motion of the relay structure to cease. The displacement motion of the final control element is fed back to the vane by a range spring. When a force balance is reached between the range spring and the input signal, the relay structure returns to a neutral position. The final control element is then in equilibrium with the input control signal. A decreasing input control signal reverses the sequence.

The nozzle essentially functions as a fulcrum in relation to the signal capsule and relay structure on the vane. The operational relationship between the signal capsule, the nozzle, and the relay structure is dependent upon the positions of these three parts along the vane. For a given position, the motions are fixed.

SUMMARY OF THE INVENTION

In accordance with the invention, the magnitude of the motion of the relay structure and, hence, the amount of air supply or exhaust, is changed by varying the position of the nozzle relative to the vane, the signal capsule and the relay structure. Since the travel of the signal capsule is fixed for any signal pressure change greater than one percent of the input span, the motion or travel of the relay structure is dependent upon the position of the nozzle.

The actual motion of the center of the relay structure is dependent on the position of the nozzle in relation to the signal capsule and relay structure. If the fulcrum established by the nozzle is positioned midway between the signal capsule and relay structure, the motion of the center structure is equal to the motion of the signal capsule. If the fulcrum established by the nozzle is moved closer to the signal capsule, the center structure must move farther to restore the nozzle back pressure to its balance level. Locating the fulcrum established by the nozzle closer to the center structure results in the center structure having to move less to restore nozzle back pressure. Since the amount which the supply and exhaust valves open is directly related to the motion of the center structure, the position of the nozzle will control the air delivery or gain of the positioner. In this way, the positioner gain can be adjusted over a broad span.

In accordance with the invention, a pneumatic positioner is provided with a O-shaped vane and a nozzle mounted for rotation on a disc. Rotation of the disc moves the nozzle along the length of the O-shaped vane so that air issuing from the outlet of the nozzle can impinge upon the vane at different locations along the length of the vane.

BRIEF DESCRIPTION OF THE DRAWINGS

In the accompanying drawings, forming a part of this specification, and in which reference numerals shown in the drawings designate like or corresponding parts throughout the same.

DETAILED DESCRIPTION

Figure 1:
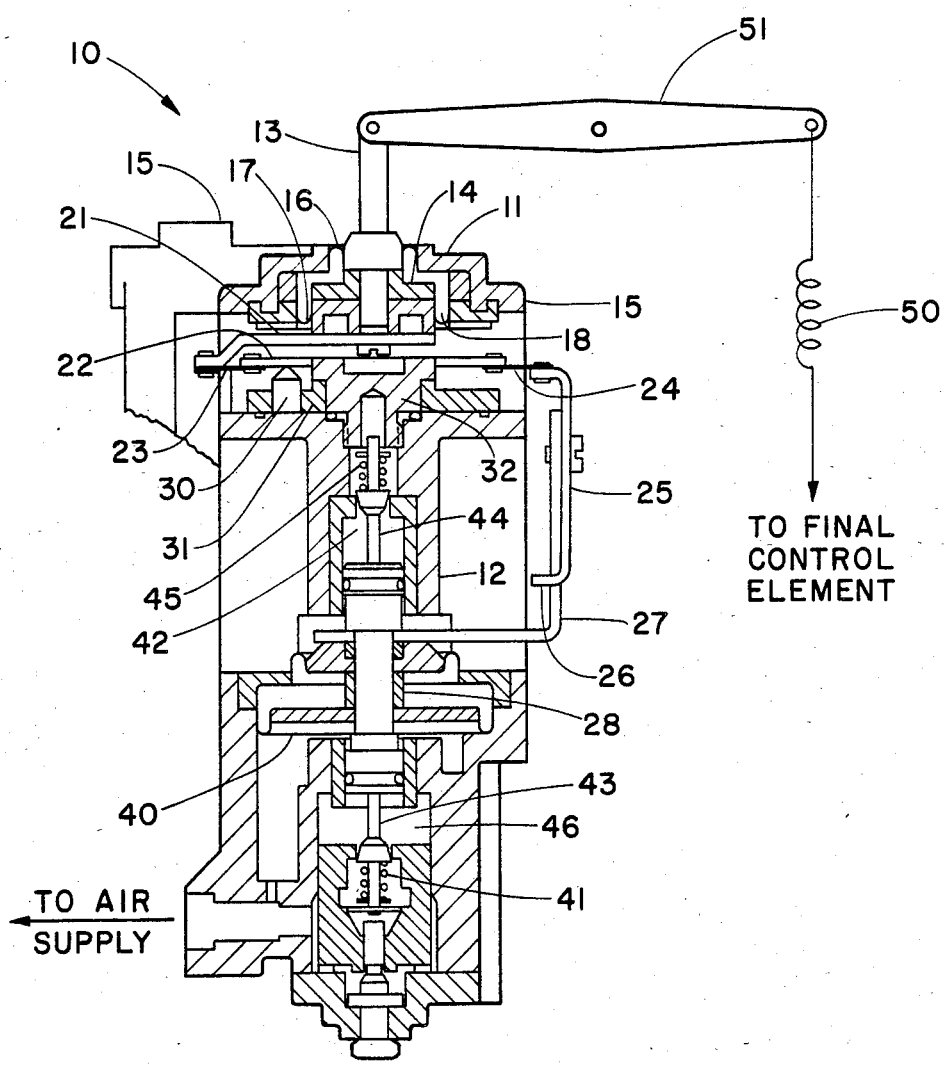
FIG. 1 is a vertical side section of a pneumatic positioner according to the invention.

A pneumatic positioner 10, shown in FIG. 1, comprises an input or signal capsule assembly 11 mounted to a relay housing 12.

The signal capsule assembly 11 has a rod 13 connected to a central support 14 that is movable within a cylinder type housing 15. The central support 14 is radially bounded by axially spaced diaphragms 16, 17 that are mechanically interconnected to upper or lower end portions of the central support 14 and the housing 15 to define a chamber 18. The central support 14 may move responsive to the pressure within chamber 18.

Figure 3:
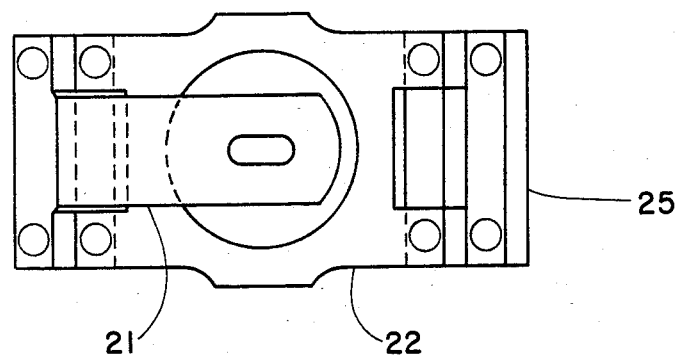
FIG. 3 is a plan view of the O-shaped Vane of FIG. 1.
Figure 4:
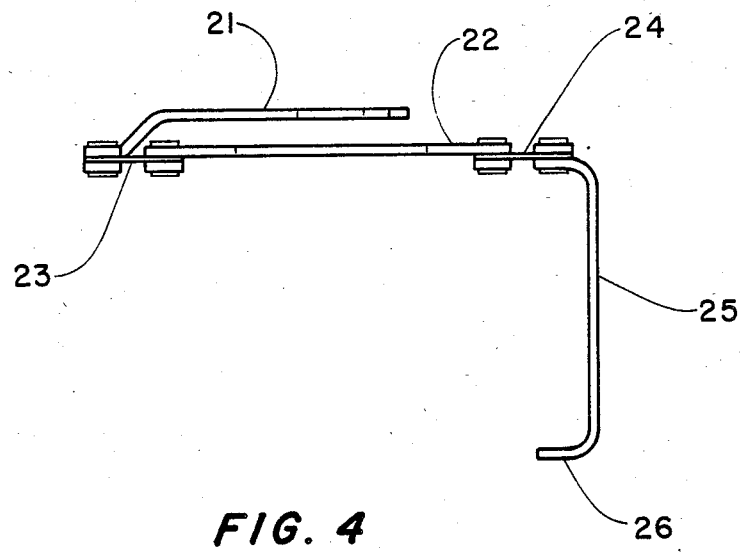
FIG. 4 is an elevation view of the O-shaped vane of FIG. 4.

A vane assembly is connected to the axially lower end of the central support 14 as oriented in the figures. The vane assembly comprises a link 21 which is connected to a first end of vane 22, having the form of a flat O-shaped strip (see FIG. 3), by a first flexible membrane 23 attached to the link 21 to define a first pivot point for the vane. The opposite, second end of the O-shaped vane 22 is connected via a second flexible membrane 24 to a vertical connection link 25 that is suspended from the second flexible membrane and terminates in a transversely extending stub 26 at its lower end.

A nozzle 30 is juxtaposed in vertical alignment with the O-shaped vane 22. The nozzle is connected to a source of air under pressure as is shown schematically in FIG. 2. Air issuing from the outlet of the nozzle 30 impinges upon the vane 22. The nozzle 30 is mounted within a disc 31 which is rotatably fitted about a central stem 32. Rotation of the disc 31 about the stem 32 repositions the nozzle 30 relative to the length of the vane 22 between the ends of the legs of the vane along an arc so that the outlet of the nozzle 30 is continuously vertically aligned with the vane 22. Movement of the vane 22 toward and away from the nozzle 30 outlet varies the restriction formed therebetween and, hence, changes the air outflow and back pressure in a nozzle back pressure line 39 upstream of the nozzle.

The vertical connection link 25, as shown in FIG. 1, is attached to a connection link 27 of a relay center structure 28.

The relay center structure 28 is mounted for rectilinear movement, in a direction parallel with the vertical connection link 25, within an elongated portion of the relay housing 12.

Figure 2:
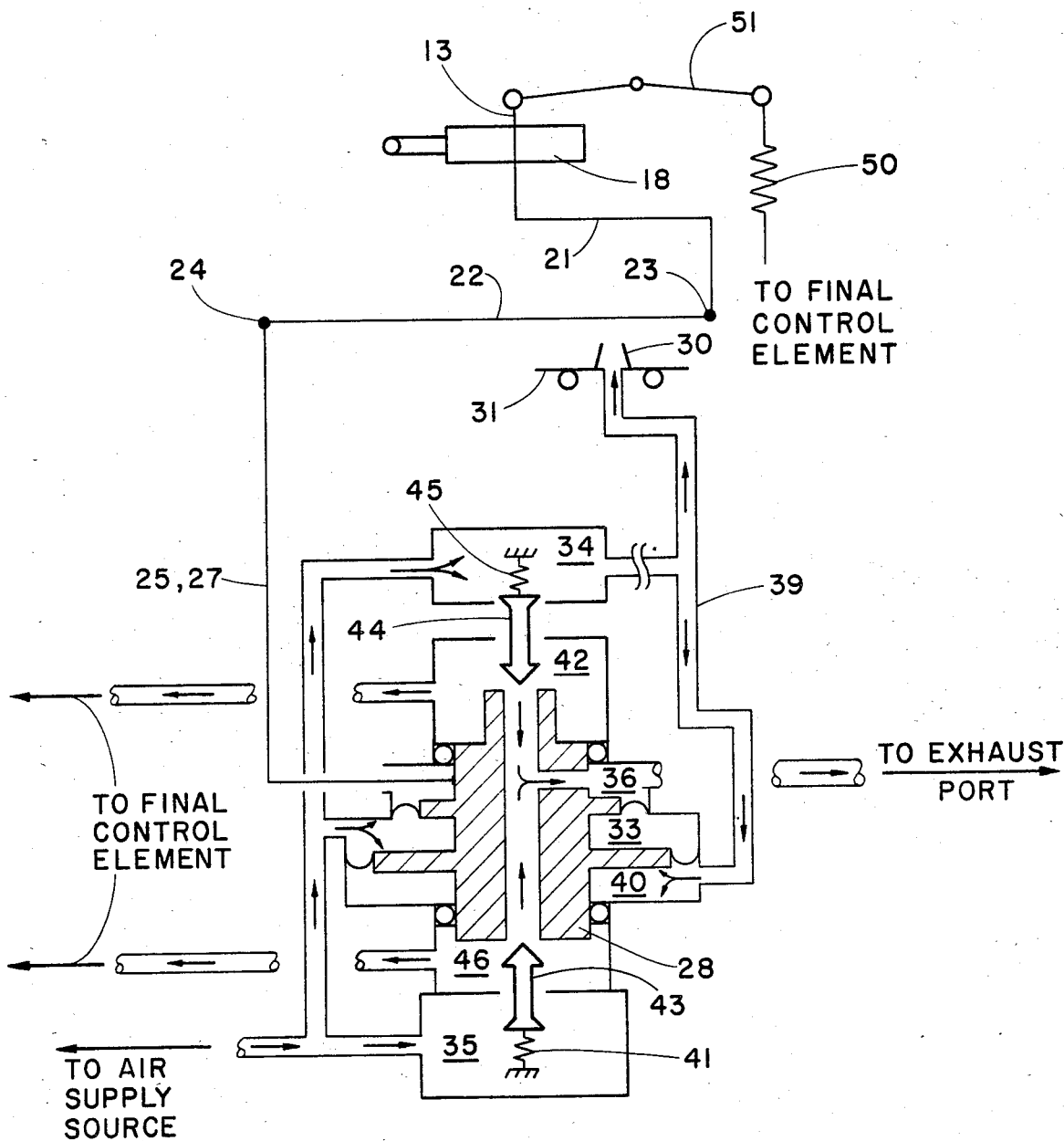
FIG. 2 is a schematic illustration of a positioner utilizing this invention.

FIG. 2 is a flow diagram schematically representing of the pneumatic passages, chambers and valves of the positioner in relation to the vane, nozzle, input capsule and relay structure.

In operation, a stream of air is continuously discharged through the outlet of the nozzle 30 which is connected to a source (not shown) of air under pressure and directed to impinge upon the O-shaped vane 22 which is movably attached to the central support 14 and relay center structure 28. An increasing input to chamber 18 will give the signal capsule 11 and vane 22 toward the nozzle 30. As the vane 22 is caused to move toward the outlet of the nozzle 30, the restriction at the outlet causes an increase in the back pressure in the nozzle back pressure line 39 and hence in a nozzle back pressure chamber 40. This causes the relay center structure 28 to move upwardly (in accordance with the orientation of the drawings) against the pressure exerted by a supply pressure reference chamber 33 until the vane 22 moves away from the outlet of the nozzle 30. In moving toward a secondary output chamber 42, a secondary chamber valve 44 seats on the relay center structure 28 and opens in a secondary supply chamber 34 in proportion of the motion; the primary chamber valve 43 seats on a primary supply chamber 35 and opens in the center structure 28 to a relay exhaust 36 in proportion to the motion of the relay center structure 28. The net result is an increase in the output of the secondary output chamber 42 and a decrease in the output of a primary output chamber 46. A positive force is maintained on the primary chamber valve 43 by a spring 41 and on the secondary chamber valve 44 by a spring 45. The pressure differential between the primary output chamber 46 and the secondary output chamber 42 is utilized to displace a final control element (not shown). The term "primary" and "secondary" are used herein solely to distinguish the respective chambers.

The displacement motion of the control element is fed back to the pneumatic positioner 10 through a range spring 50 which, for example, is pivotably interconnected to the rod 13 by a pivot arm 51. Thus, the range spring 50 together with the input or actuating pressure moves the vane 22 as desired. When a force balance is reached between the range spring 50 and the input signal, the relay center structure 28 returns to a neutral position, closing the primary chamber valve 43 and the secondary chamber valve 44.

The motion of travel of the relay center structure is dependent upon the position of the nozzle 30.

As described above, an increasing input will move the signal capsule 11 and vane 22 toward the nozzle 30. The resulting increase in the nozzle back pressure chamber 40 gives the relay center structure 28. The relay center structure 28 is mechanically linked to the opposite end of the vane 22 from the signal capsule 11. The direction of movement of the relay centre structure 28 provides negative feedback to the vane 22, moving it away from the nozzle. The motion of the relay center structure 28 will continue until the vane 22 has been moved far enough away from the nozzle 30 to return the nozzle back pressure chamber 40 to its balance level. The actual motion of the relay center structure 28 is dependent on the position of the nozzle 30 in relation to the signal capsule 11 and relay center structure pivot points 23,24. If the nozzle 30 is positioned midway between the two pivot points 23,24, the motion of the relay center structure 28 is equal to the motion of the signal capsule 11. If the nozzle 30 is moved closer to the signal capsule pivot 24, the relay center structure 28 must move farther to restore the nozzle back pressure chamber 40 to its balance level. Locating the nozzle 30 closer to the relay center structure pivot 23 results in the relay center structure 28 having to give less to restore the nozzle back pressure chamber to its balance level. Since the amount which the primary and secondary chamber valves 43,44 open and close is directly related to the motion of the relay center structure 28, the position of the nozzle 30 will control the air delivery or gain of the pneumatic positioner 10. In this way the positioner gain can be adjusted over a board span.

The embodiments of the invention in which an exclusive property or privilege is claimed are defined as follows:

1. In a pneumatic positioner of the type having a nozzle connected to a source of air under pressure, a flat vane juxtaposed adjacent to the outlet of the nozzle, and input means operatively connected to a first end of the vane for pivotally moving the vane relative to the outlet to variably restrict the outflow of air from the outlet and vary the back-pressure of the nozzle, and means operatively connected to a second end of the vane for generating an output signal, said nozzle being juxtaposed to a portion of the vane intermediate said first and second ends, the improvement wherein the vane comprises an O-shaped strip having an O-shaped recess, an elongated stem extending into the O-shaped recess between the first and second ends of the strip, a disc mounted on the stem for rotation, the nozzle being mounted in the disc for movement therewith with the outlet of the nozzle continuously aligned with the vane along a path between the first and second ends for the entire range of disc and nozzle movement, and a first flexible membrane connected to the first end of the vane at one end and to a link member at the other end, the link member being a strip vertically spaced from and substantially parallel to the O-shaped strip and being connected to the input means.

2. The improvement as set forth in claim 1 further comprising a second flexible membrane interconnected between the second end of the vane and the signal generating means.

3. The improvement as set forth in claim 1 further comprising a second flexible membrane interconnected between the second end of the vane and the signal generating means and wherein the signal generating means comprises a cylindrical relay housing, a relay center structure slidably received in the housing, and a link mechanically interconnected between the relay center structure and the flexible membrane.

* * * * *

UNITED STATES PATENT AND TRADEMARK OFFICE
CERTIFICATE OF CORRECTION

PATENT NO. : 4,605,033
DATED : Aug. 12, 1986
INVENTOR(S) : Lee A. Weber

It is certified that error appears in the above-identified patent and that said Letters Patent are hereby corrected as shown below:

Column 3, line 15 change "give" to --move--.

Signed and Sealed this

Thirtieth Day of December, 1986

Attest:

DONALD J. QUIGG

*Attesting Officer*     *Commissioner of Patents and Trademarks*